United States Patent
Gold et al.

(10) Patent No.: US 11,571,762 B2
(45) Date of Patent: Feb. 7, 2023

(54) PRINTING METHOD TO SELECTIVELY DEPOSIT BRAZE POWDERS AT ONE OR MORE PREDETERMINED LOCATIONS ON A SURFACE

(71) Applicants: Rolls-Royce Corporation, Indianapolis, IN (US); Rolls-Royce North American Technologies Inc., Indianapolis, IN (US)

(72) Inventors: Matthew Gold, Carmel, IN (US); Greg Lopshire, McCordsville, IN (US); Raymond Xu, Carmel, IN (US); Carl Russo, Clayton, IN (US)

(73) Assignees: Rolls-Royce North American Technologies Inc., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 203 days.

(21) Appl. No.: 16/684,921

(22) Filed: Nov. 15, 2019

(65) Prior Publication Data
US 2021/0146459 A1 May 20, 2021

(51) Int. Cl.
- B23K 1/00 (2006.01)
- B23K 37/00 (2006.01)
- B23K 35/02 (2006.01)

(52) U.S. Cl.
CPC .......... *B23K 1/0018* (2013.01); *B23K 35/025* (2013.01)

(58) Field of Classification Search
CPC .... B23K 35/025; B23K 1/19; B23K 35/0244; B23K 1/0012; B23K 1/0018; B23K 3/0607; B23K 1/0016; B23K 1/008; B23K 20/026; B23K 2101/001; B23K 2101/14
See application file for complete search history.

(56) References Cited

U.S. PATENT DOCUMENTS

| | | | |
|---|---|---|---|
| 4,475,959 A * | 10/1984 | Liang | B23K 35/025 148/24 |
| 5,976,337 A | 11/1999 | Korinko et al. | |
| 6,085,943 A * | 7/2000 | Cavallaro | G01F 11/022 222/309 |
| 6,331,217 B1 | 12/2001 | Burke et al. | |
| 2001/0001042 A1 | 5/2001 | Sinatra et al. | |
| 2001/0013390 A1 | 8/2001 | Staubwasser | |

(Continued)

FOREIGN PATENT DOCUMENTS

| | | |
|---|---|---|
| EP | 0 049 489 A1 | 4/1982 |
| EP | 1 987 903 A2 | 11/2008 |

(Continued)

OTHER PUBLICATIONS

CN110524079A abstract Jul. 31, 2019 (Year: 2021).*

*Primary Examiner* — Erin B Saad
(74) *Attorney, Agent, or Firm* — Crowell & Moring LLP

(57) ABSTRACT

A printing method for selectively depositing braze powders on a surface comprises extruding a filament from a nozzle moving relative to a surface, where the filament comprises a flowable carrier mixed with a braze powder. As the nozzle moves, the filament is deposited on the surface in a predetermined pattern defined by the motion of the nozzle relative to the surface; thus, the braze powders are deposited at one or more predetermined locations on the surface.

15 Claims, 6 Drawing Sheets

(56) References Cited

U.S. PATENT DOCUMENTS

| | | |
|---|---|---|
| 2004/0169063 A1 | 9/2004 | Stueber et al. |
| 2008/0199718 A1* | 8/2008 | Sjodin ................ B23K 35/3053 |
| | | 428/594 |
| 2012/0000967 A1* | 1/2012 | Bischof .................... F01D 5/30 |
| | | 228/256 |
| 2013/0343789 A1 | 12/2013 | Motoda et al. |
| 2015/0125281 A1* | 5/2015 | Georgieva ............. B23K 35/36 |
| | | 415/200 |
| 2015/0125334 A1* | 5/2015 | Uetani .................... B22F 10/10 |
| | | 419/6 |
| 2015/0184514 A1 | 7/2015 | Schmitt et al. |
| 2017/0008084 A1 | 1/2017 | Witney et al. |
| 2017/0246698 A1 | 1/2017 | Bruck |
| 2017/0120362 A1* | 5/2017 | Reid ....................... B23K 3/08 |
| 2018/0080336 A1 | 3/2018 | Lin |
| 2018/0230584 A1 | 8/2018 | Lin et al. |

FOREIGN PATENT DOCUMENTS

| | | |
|---|---|---|
| EP | 3 049 627 A1 | 8/2016 |
| GB | 2 051 624 A | 1/1981 |
| JP | 2019072772 A | 5/2019 |
| WO | WO 2015/047698 | 4/2015 |

\* cited by examiner

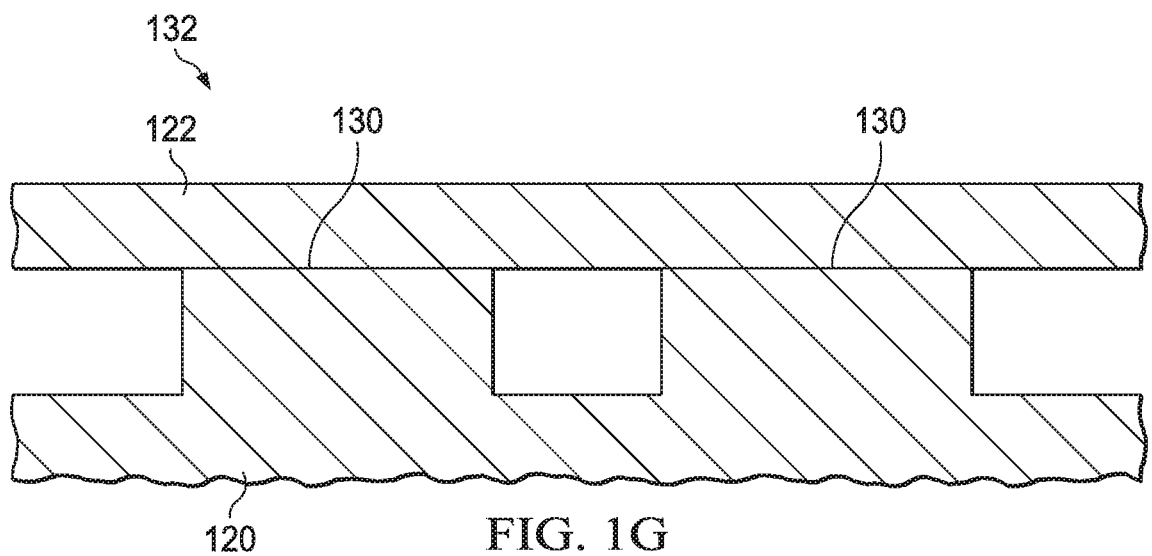

PRINTING METHOD TO SELECTIVELY DEPOSIT BRAZE POWDERS AT ONE OR MORE PREDETERMINED LOCATIONS ON A SURFACE

TECHNICAL FIELD

The present disclosure relates generally to applying braze powders to surfaces, and more particularly to a printing method to selectively deposit braze powders at one or more predetermined locations on a surface.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. In a conventional turbine compressor, turbine blades may be fabricated separately from the rotor disk and then mechanically assembled such the turbine blades extend from machined slots on the disk; however, this configuration has the disadvantage of discontinuities between the blades and the disk. To eliminate such discontinuities, diffusion bonding techniques have been developed to bond the turbine blades to the disk to form a mechanically robust, monolithic component (a "turbine blisk"). Diffusion bonding is a solid-state bonding method, where elevated temperatures and typically high pressures are employed to obtain diffusion of atoms between mating components, allowing for formation of a thermally-stable metallurgical bond. Various gas turbine engine components may benefit from diffusion bonding.

Diffusion bonding may be facilitated or improved by utilizing diffusion agents or braze materials, such as braze foils or powders, between the components to be joined. However, the bonding of components having complex surface geometries can present challenges with the use of such diffusion agents. For example, the use of braze foils may not be effective for irregular or discontinuous surfaces, and it may be difficult if not impossible to deposit consistent levels of braze powder on such surfaces using methods known in the art. In addition, conventional methods of braze powder application, which typically provide blanket surface coverage of costly braze alloys, may lead to waste and/or bonding problems when applied to complex or discontinuous surfaces.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

FIGS. 1E to 1G illustrate diffusion bonding of the surface to a mating surface.

FIG. 2 shows an exemplary assembly for diffusion bonding comprising a spar and a cover sheet.

DETAILED DESCRIPTION

A printing method to selectively deposit braze powders at one or more predetermined locations on a surface has been developed.

Figure 1A:
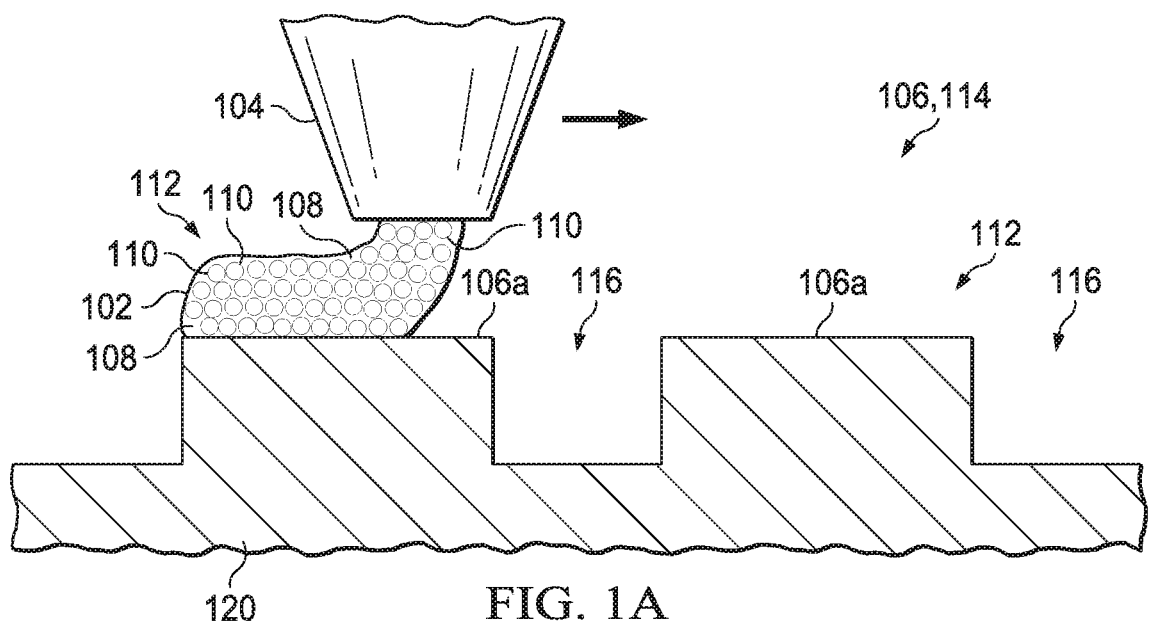
FIGS. 1A to 1D-2 are cross-sectional schematics illustrating a printing method of selectively depositing braze powders at one or more locations on a surface.
Figure 1B:
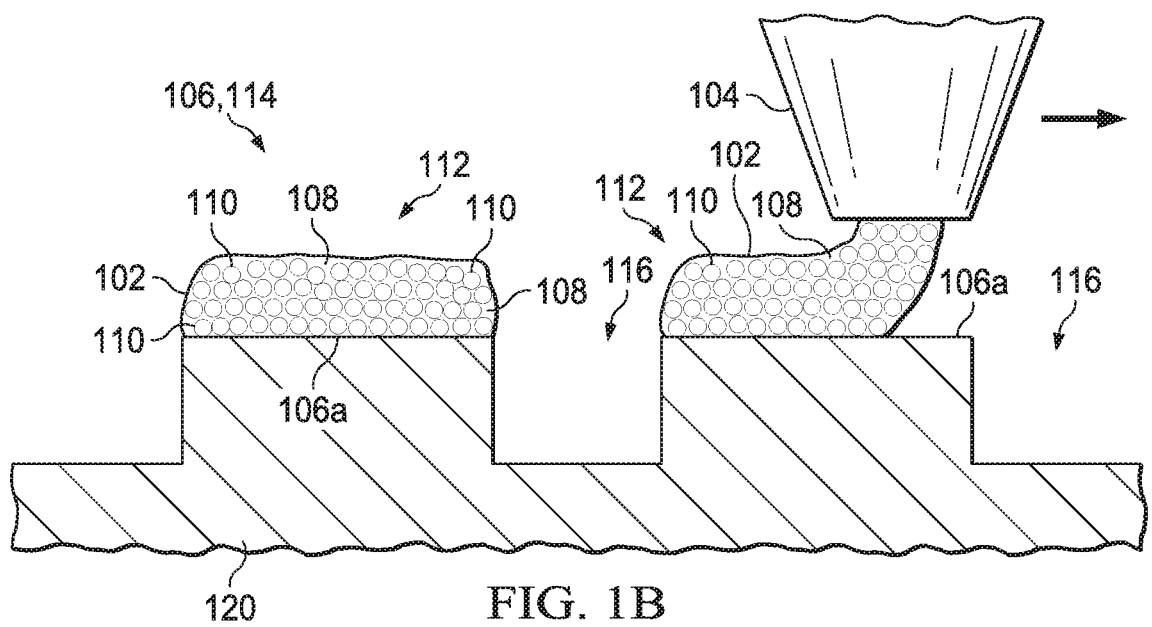
Figure 1C:
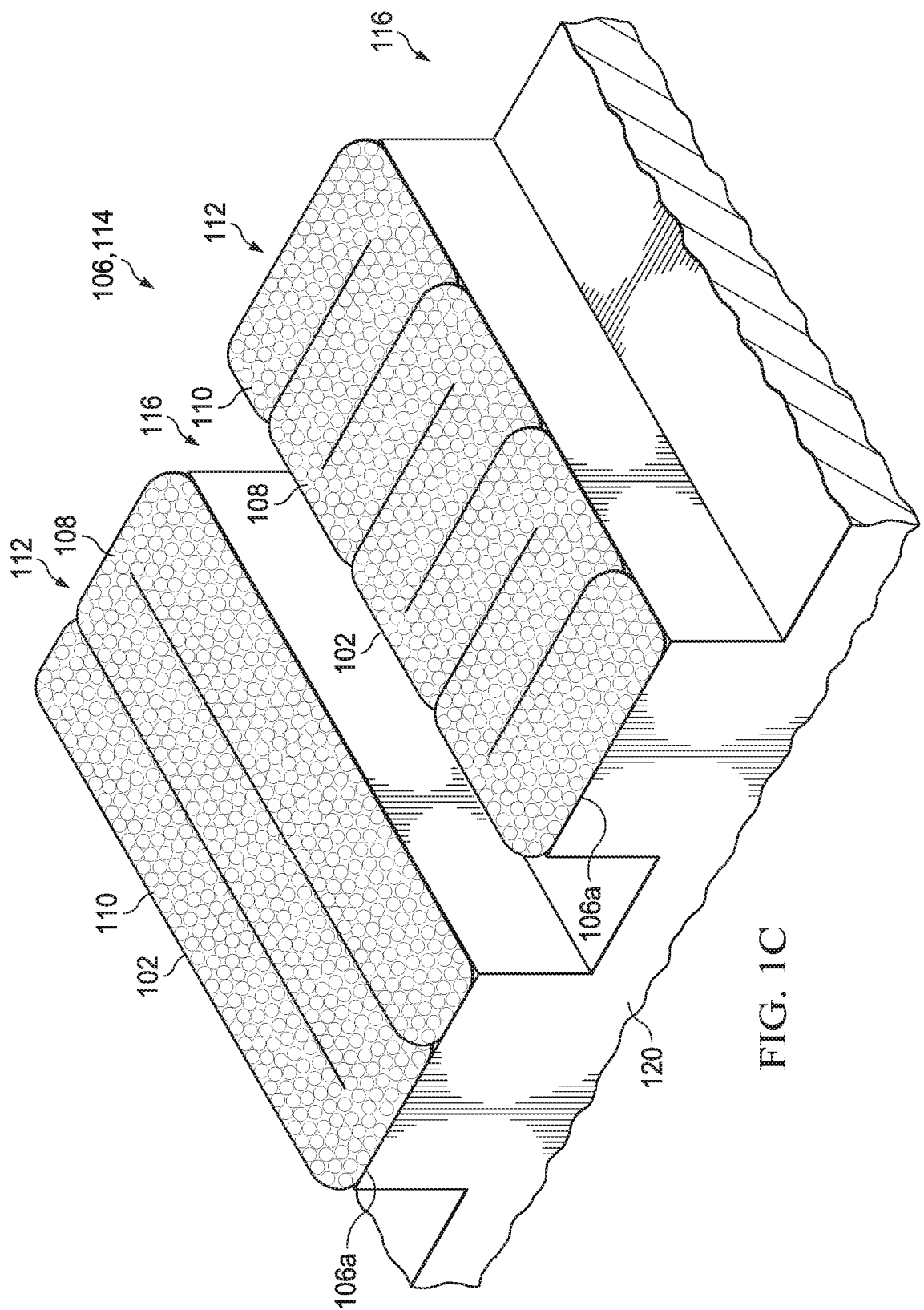

Referring to FIGS. 1A-1C, the method comprises extruding a filament 102 from a nozzle 104 moving relative to a surface 106, where the filament 102 comprises a flowable carrier 108 mixed with a braze powder 110. The filament 102 may be described as an extruded filament. The surface 106 is part of a first component 120 that may comprise a metal alloy. As the nozzle 104 moves, the filament 102 is deposited on the surface 106 in a predetermined pattern defined by the relative motion of the nozzle 104 and the surface 106. The predetermined pattern may be continuous or discontinuous. Thus, the braze powders 110 may be deposited at one or more predetermined locations 112 on the surface 106.

As illustrated, the surface 106 may be a discontinuous surface 114 comprising surface regions 106a separated by gaps or holes 116. In this example, the filament 102, and concomitantly the braze powders 110, are selectively deposited on the surface regions 106a. In other words, the filament 102 and the braze powders 110 may be deposited only on the surface regions 106a. The surface regions 106a may be coplanar, as shown. As explained below, the filament 102 is able to substantially hold its shape while deposited on the surface 106. Accordingly, due to the properties of the filament 102 and the selective deposition, neither the flowable carrier 108 nor the braze powders 110 are deposited into the gaps 114.

It should be understood that references to the nozzle 104 moving relative to the surface 106 may encompass any of the following situations: (1) the nozzle 104 moving while the surface 106 remains stationary; (2) the nozzle 104 remaining stationary while the surface 106 moves; and/or (3) the nozzle 104 moving while the surface 106 also moves. The relative motion of the nozzle 104 and the surface 106 may be electronically controlled in three-dimensions (along x-, y- and/or z-axes), and thus a single layer and/or multiple layers of the filament 102 may be continuously or semi-continuously deposited (e.g., with starts and stops to accommodate a discontinuous pattern) onto the surface 106. This approach, which is sometimes referred to as 3D printing, fused deposition modeling (FDM), and/or additive manufacturing, can be carried out using a commercially available printer. Due to the relative motion of the nozzle and the surface, extrusion and/or deposition of the filament may occur at a rate from about 1 mm/s to about 1 m/s, or even faster. Typically, the nozzle 104 has an inner diameter in a range from about 50 microns to 1 mm. The inner diameter of the nozzle 104 may determine or at least influence the diameter of the extruded filament 102 and consequently the thickness of a deposited layer. Typically, the filament 102 and consequently the braze powders 110 deposited on the surface 106 span a height in a range from 50 microns to 600 microns (0.05-0.6 mm). In some cases, the height may range from 100 microns to 300 microns (0.1-0.3 mm).

The filament 102 may be highly loaded with braze powder 110. For example, the filament 102 may include the braze powder 110 in an amount of about 50 wt. % or greater, or about 70 wt. % or greater, with a balance or remainder being the flowable carrier 108 and optionally minor amounts of other additive(s). The amount of braze powder may lie in the range from about 50 wt. % to about 90 wt. %, or from 70 wt. % to about 90 wt. %. Accordingly, the filament 102 may include just enough of the flowable carrier 108 to allow for extrusion and printing, such as about 50 wt. % or less, or about 30 wt. % or less, or about 10 wt. % or less.

In some cases, it may be preferred that the filament 102 includes a lesser amount of braze powder 110. For example, the filament 102 may include braze powder 110 in an amount of about 50 wt. % or less, or about 30 wt. % or less. The amount of braze powder may lie in the range from about 10 wt. % to about 50 wt. % or from about 10 wt. % to about 30 wt. %, with a balance or remainder being the flowable carrier 108 and optionally minor amounts of other additive(s). In this case, the filament 102 may include a more substantial amount of the flowable carrier 108, which may promote ease of extrusion and printing, such as at least about 50 wt. %, at least about 70 wt. %, or at least about 90 wt. %.

As indicated above, the surface 106 is part of a first component 120 that may comprise a metal alloy, such as a nickel-base alloy, a titanium-base alloy, or an iron-base alloy. The metal alloy may be suitable for high temperature applications. For example, the first component 120 may be part of an airfoil, a combustion liner, or a heat shield of a gas turbine engine.

Accordingly, the braze powder 110 may comprise a braze alloy suitable for elevated temperature usage. For example, nickel-based braze alloys may be employed for high temperature service applications and may be used for bonding nickel-base alloys, such as nickel-base superalloys utilized in gas turbine engines. Suitable nickel-based braze alloys may include nickel alloyed with boron, chromium, manganese, and/or silicon. Titanium-based braze alloys may also be employed for high temperature service applications and may be suitable for bonding titanium-base alloys, such as titanium aluminides. Suitable titanium-based braze alloys may include titanium alloyed with copper, nickel and/or zirconium. Commercially available braze powder 110 may be employed. Iron-based braze alloys may be suitable for bonding iron-base alloys. The braze powder may include particles of a spheroidal, spherical, polygonal, elongated, irregular, or other morphology. Typically, the particles have a nominal size (e.g., width or diameter) in the range of tens or hundreds of microns.

The printing process may be carried out in a controlled environment (e.g., vacuum or an inert gas atmosphere) or in air. The printing process may entail heating. For example, for a flowable carrier 108 comprising a thermoplastic polymer, the nozzle 104 may be heated during extrusion to promote softening and/or melting (and thus flow) of the flowable carrier 108 during extrusion. The extrusion may thus be carried out at a temperature ("extrusion temperature") at or above a softening and/or melting temperature of the flowable carrier 108 to ensure flowability during extrusion. In contrast, the braze powder 110 remains solid and is transported by the flowable carrier 108 during extrusion. Generally speaking, the extrusion temperature may lie in a range from about 150° C. to about 320° C., and more typically may be from about 160° C. to 220° C.

Depending on the properties of the flowable carrier 108, such as glass transition temperature, the surface 106 on which the filament 102 is deposited may also be heated. Heating of the deposition surface 106 may allow for control over cooling and solidification of the filament 102 once deposited. Typically, the surface 106 is at room temperature (e.g., from 18° C. to 25° C.) or is heated to a temperature in a range from 26° C. to 100° C.

Figures 1, 1D:
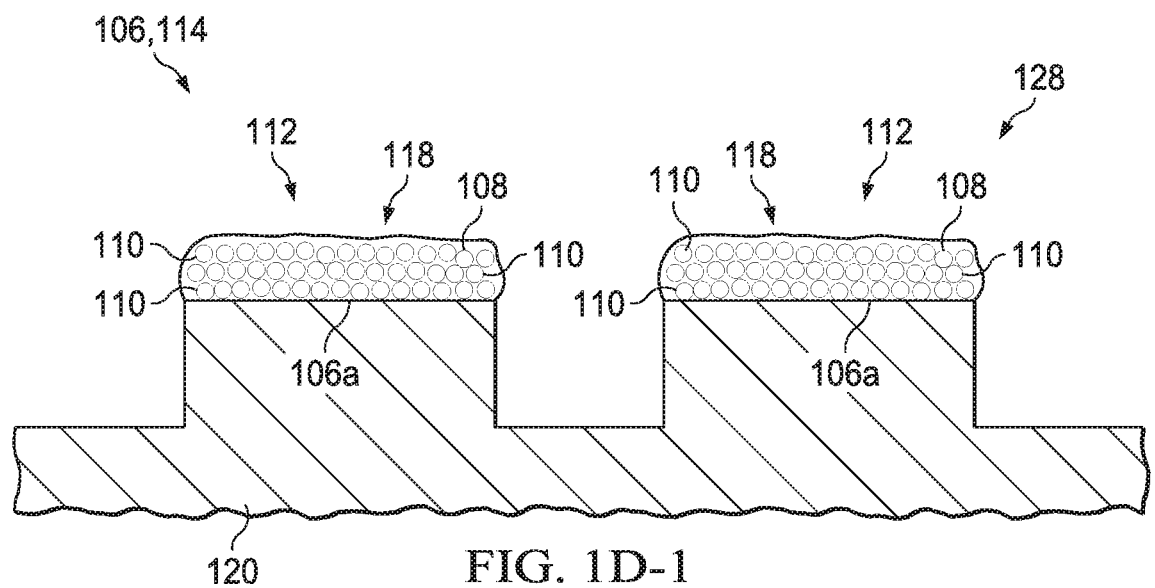

After the extrusion, the filament 102 cools and the flowable carrier 108 solidifies, adhering the braze powder 110 to the surface 106 (e.g., surface regions 106a), thereby forming a prewet surface 128 for diffusion bonding, as illustrated in FIG. 1D-1. The braze powder 110 adhered to the surface may be described as a braze deposit 118. Notably, the braze powder 110 is adhered to the surface 106 (only) at the one or more locations 112 determined by the printing process.

The feedstock for extrusion may be solid pellets or a solid filament comprising a composite of the flowable carrier 108 and the braze powders 110. Suitable thermoplastic polymers for the flowable carrier 108 may include polylactic acid (PLA), acrylonitrile butadiene styrene (ABS), polycarbonate (PC), polyethylene terephthalate (PET), thermoplastic polyurethane (TPU), high-impact polystyrene (HIPS), polyvinyl alcohol (PVA), nylon, or mixtures of these.

In another example, the extrusion may be carried out at room temperature (e.g., from 18° C. to 25° C.) with a flowable carrier 108 that is flowable at room temperature and does not require heating to induce flow, as described above. A filament 102 comprising such a flowable carrier 108 and the braze powder 110 may be forced through the nozzle 104 under an applied pressure at room temperature. The filament 102 preferably has a viscosity sufficient to maintain its shape while deposited on the surface 106, and may be viscoelastic to permit easy flow through the nozzle. The filament 102 comprising the flowable carrier 108 and the braze powder 110 may have a viscosity in a range from about 2,000 cP to about 5,000 cP at room temperature, in one example. The flowable carrier 108 may comprise a water-based or organic binder gel, such as Vitta-Braz Binder Gel (Vitta Corporation, Bethel, Conn.), which may comprise polymer(s) and water.

Figures 1, 1D, 2:
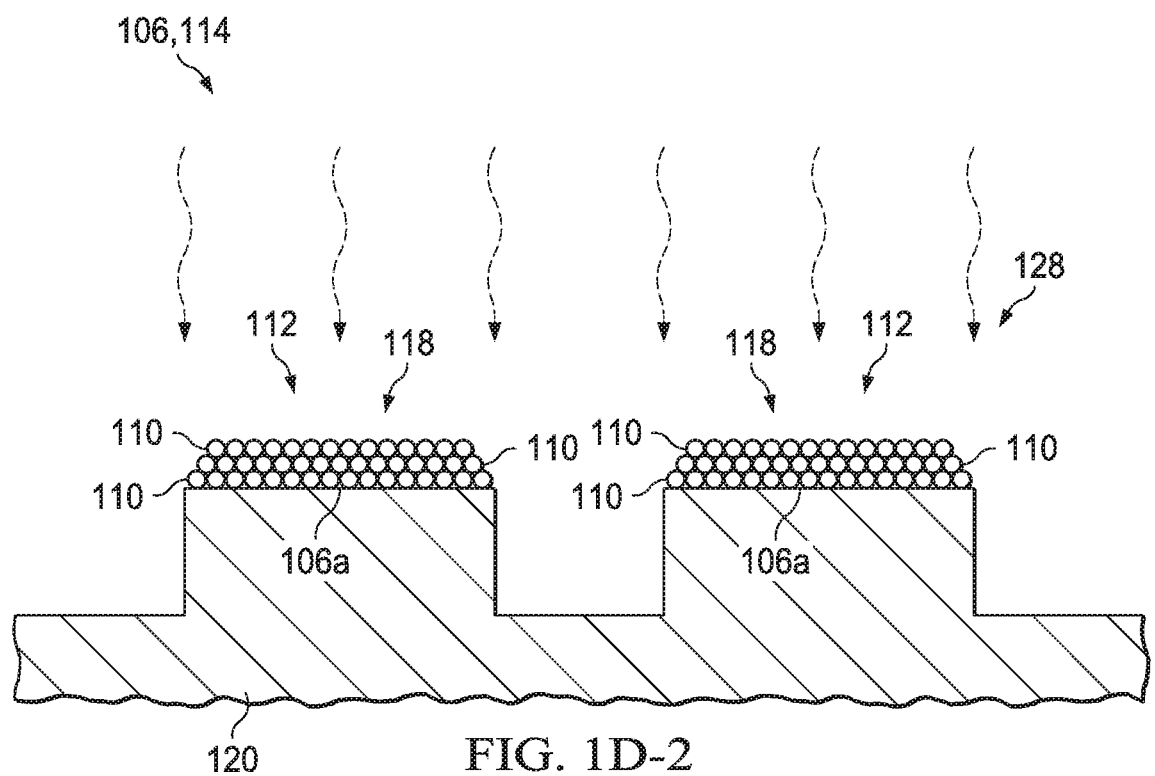

After depositing the filament 102 on the surface 106 in this example, where extrusion occurs at room temperature, the filament 102 may be heated to remove the flowable carrier 108 (e.g., by pyrolysis or vaporization) and/or the surface 106 may be heated to raise the temperature of the filament 102 to the desired pyrolysis or vaporization (evaporation) temperature. Suitable temperatures may lie in a range from about 100° C. to about 125° C. for water-based carriers 108, and may be higher depending on the composition of the flowable carrier 108. Generally speaking, the temperature may be no higher than the solidus of the braze powder 110, where the solidus is the highest temperature at which the braze powder is completely solid. During the heating, the flowable carrier 108 is removed and the braze powder 110 is adhered to the surface 106 (e.g., surface regions 106a), forming a prewet surface 128 for diffusion bonding, as illustrated in FIG. 1D-2. The braze powder 110 adhered to the surface may be described as a braze deposit 118. Notably, the braze powder 110 is adhered to the surface 106 (only) at the one or more locations 112 determined by the printing process.

Figure 1E:
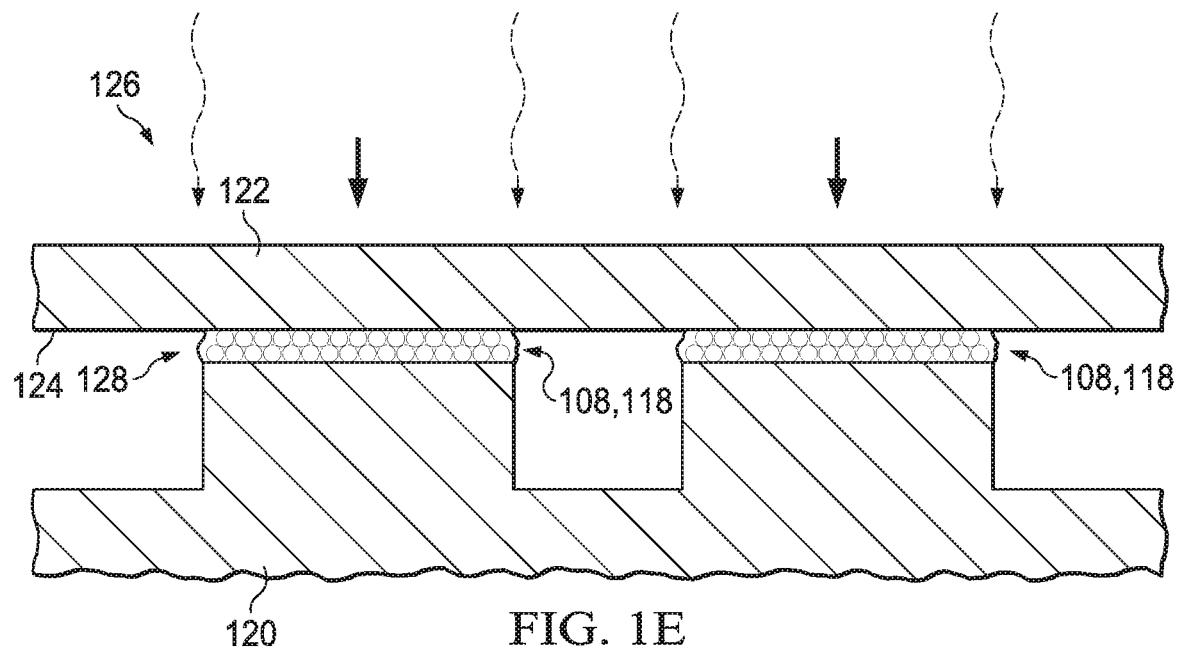
Figure 1F:
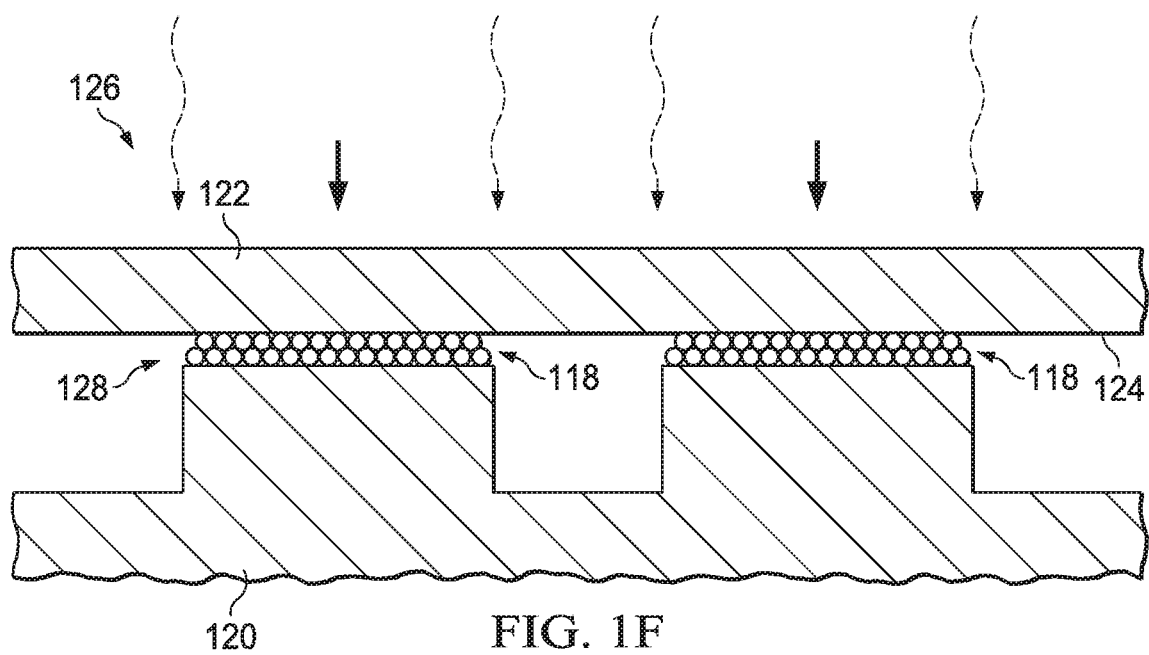
Figure 2:
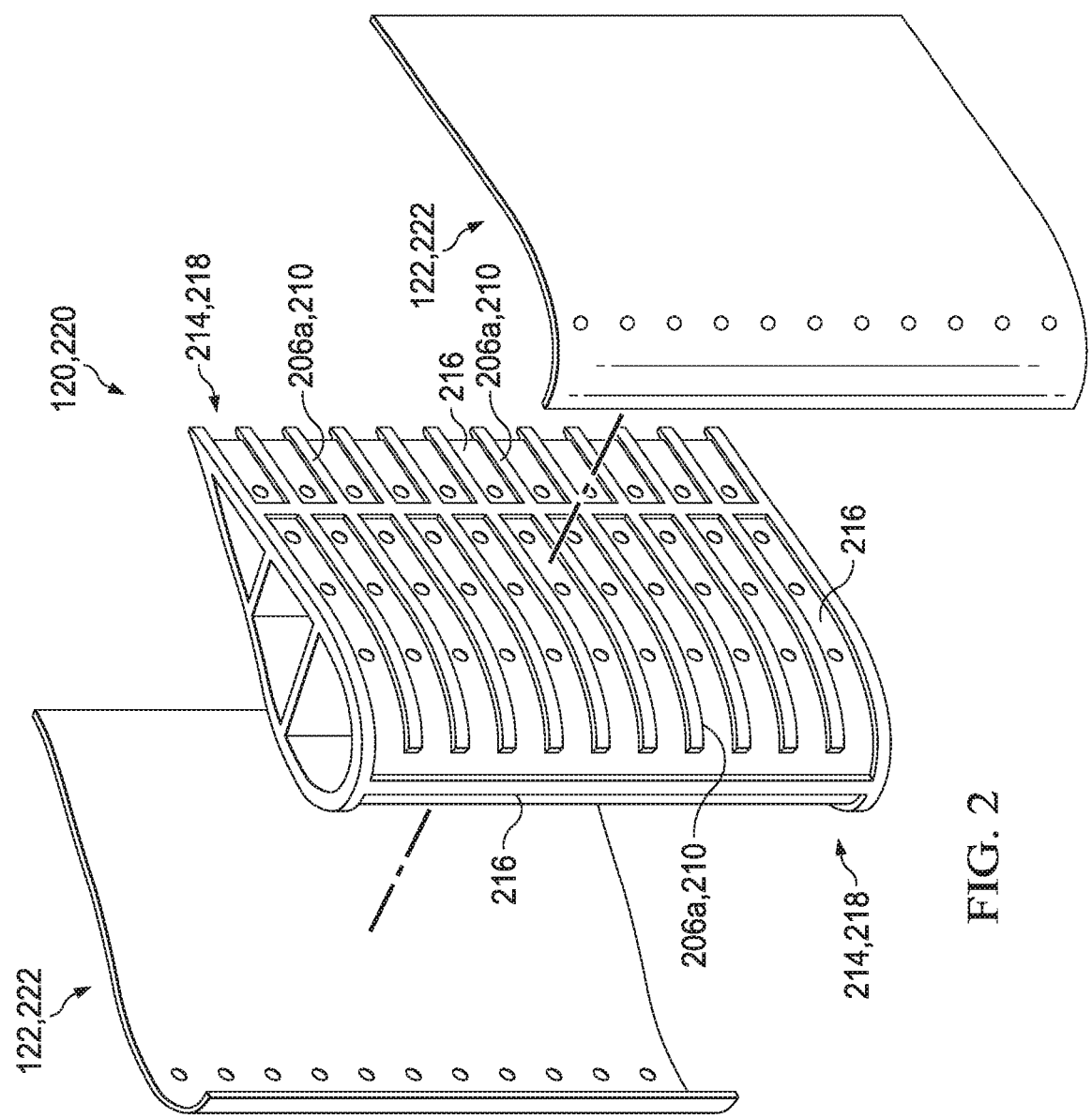

Referring to FIGS. 1F and 1G, a method of diffusion bonding comprises assembling a first component 120 comprising the prewet surface 128 described above (according to two different examples) with a second component 122 comprising a mating surface 124 to form an assembly 126, where the prewet surface 128 (more specifically, the braze deposit 118) contacts the mating surface 124. If the prewet surface 128 is formed according to the first example described above, the prewet surface 128 may include the flowable carrier 108 in solid form in addition to the braze deposit 118. Accordingly, it may be advantageous, prior to diffusion bonding, to warm the assembly 126 to a softening temperature (e.g., from about 160° C. to about 220° C.) and apply a moderate pressure that may allow for softening of the flowable carrier 108 and thus distribution and thinning of the braze deposit 118, as illustrated in FIG. 1E.

Returning to FIG. 1F, to carry out diffusion bonding, the assembly 126 is exposed to a bonding temperature and a compressive force, preferably in a controlled environment such as a vacuum or inert gas atmosphere, and the first component 120 is diffusion bonded to the second component 122. Diffusion bonding may be carried out using methods known in the art. Typically, the bonding temperature lies in a range from about 900° C. (~1650° F.) to about 1275° C. (~2325° F.), or from about 1000° C. (~1830° F.) to about 1100° C. (2010° F.), depending on the alloy(s) being bonded.

Once metallurgically bonded together, the first component 120 and the second component 122 form a monolithic third component 132 comprising a homogeneous bonded interface 130 that may be substantially free of unwanted phases, defects, and/or porosity. In one example, the monolithic third component 128 comprises an airfoil, as described below. The first and second components 120, 122 may have a single-crystalline or polycrystalline (e.g., equiaxed) microstructure. In other words, the first component 120 may be single-crystalline or polycrystalline, and the second component 122 may be single-crystalline or polycrystalline. When both the first and second components 120, 122 have a single-crystalline structure, a directionally solidified microstructure may be obtained across the bonded interface 130. The method is applicable to nickel-base alloys, iron-base alloys, and titanium-base alloys, such as titanium aluminides.

Referring now to FIG. 2, the first component 120 may be a spar 220 and the second component 122 may be a cover sheet 222, which, when bonded together as described above, may form part or all of an airfoil with dual-wall cooling for use in a gas turbine engine. More specifically, the spar 220 may include a discontinuous surface 214 that undergoes the printing process described above such that the braze powder 210 is adhered only to the surface regions 206a, forming a prewet surface 218. Referring to FIG. 2, the spar 220 may include raised surface features or "pedestals" having ends 206a that constitute the surface regions of the discontinuous surface 214, and flow channels 216 between the pedestals that constitute the gaps described above. The arrangement of the pedestals and flow channels 216 shown in FIG. 2 is provided as an example only and is not intended to be limiting. Besides airfoils (e.g., turbine blades or vanes), the above-described method may be applicable to the fabrication of combustion liners, heat shields, and/or other gas turbine engine components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a printing method for selectively depositing braze powders on a surface, the method comprising: extruding a filament from a nozzle moving relative to a surface, the filament comprising a flowable carrier mixed with a braze powder; and as the nozzle moves, depositing the filament on the surface in a predetermined pattern defined by the motion of the nozzle relative to the surface, the braze powders thereby being deposited at one or more predetermined locations on the surface.

A second aspect relates to the method of the first aspect, wherein the predetermined pattern is a continuous pattern.

A third aspect relates to the method of the first or second aspect, wherein the predetermined pattern is a discontinuous pattern.

A fourth aspect relates to the method of any preceding aspect, wherein the surface is a discontinuous surface comprising surface regions separated by gaps, and wherein the filament and thus the braze powders are selectively deposited on the surface regions.

A fifth aspect relates to the method of any preceding aspect, wherein the surface is part of a first component comprising a metal alloy.

A sixth aspect relates to the method of any preceding aspect, wherein the first component comprises part of an airfoil, a combustion liner, or a heat shield of a gas turbine engine.

A seventh aspect relates to the method of any preceding aspect, wherein the braze powder comprises a nickel-based braze alloy, a titanium based-braze alloy, or an iron-based braze alloy.

An eighth aspect relates to the method of any preceding aspect, wherein the filament includes braze powder in an amount from about 50 wt. % to about 90 wt. %.

A ninth aspect relates to the method of any preceding aspect, wherein the flowable carrier comprises a thermoplastic polymer.

A tenth aspect relates to the method of the ninth aspect, wherein the thermoplastic polymer comprises polylactic acid (PLA), acrylonitrile butadiene styrene (ABS), polycarbonate (PC), polyvinyl alcohol (PVA), and/or nylon.

An eleventh aspect relates to the method of any preceding aspect, wherein the extrusion is carried out at a temperature at or above a softening temperature and/or melting temperature of the flowable carrier.

A twelfth aspect relates to the method of the eleventh aspect, wherein, after the extrusion, the filament cools and solidifies, adhering the braze powder to the surface, thereby forming a prewet surface for diffusion bonding.

A thirteenth aspect relates to a method of diffusion bonding comprising: assembling a first component comprising the prewet surface of the twelfth aspect with a second component comprising a mating surface to form an assembly, the prewet surface contacting the mating surface; and exposing the assembly to a bonding temperature, thereby diffusion bonding the first component to the second component to form a monolithic third component comprising a bonded interface.

A fourteenth aspect relates to the method of any preceding aspect, wherein the extrusion is carried out at room temperature.

A fifteenth aspect relates to the method of any preceding aspect, wherein the flowable carrier has a viscosity sufficient to maintain a shape of the filament while deposited on the surface.

A sixteenth aspect relates to the method of any preceding aspect, wherein the flowable carrier comprises an aqueous or organic binder gel.

A seventeenth aspect relates to the method of any preceding aspect, wherein, after depositing the filament on the surface, heating the filament to remove the flowable carrier and adhere the braze powder to the surface, forming a prewet surface for diffusion bonding.

An eighteenth aspect relates to the method of the seventeenth aspect, wherein heating the filament to remove the flowable carrier comprises pyrolyzing or evaporating the flowable carrier.

A nineteenth aspect relates assembly of the seventeenth or eighteenth aspects, wherein the heating is carried out in a vacuum or an inert gas atmosphere.

A twentieth aspect relates to a method of diffusion bonding comprising: assembling a first component comprising the prewet surface of the seventeenth aspect with a second component comprising a mating surface to form an assembly, the prewet surface contacting the mating surface; and heating the assembly to a bonding temperature, thereby diffusion bonding the first component to the second component to form a monolithic third component comprising a bonded interface.

In addition to the features mentioned in each of the independent aspects enumerated above, some examples may show, alone or in combination, the optional features mentioned in the dependent aspects and/or as disclosed in the description above and shown in the figures.

What is claimed is:

1. A printing method to selectively deposit braze powders on a surface, the method comprising:
   extruding a filament from a nozzle moving relative to a surface, the filament comprising a flowable carrier mixed with a braze powder, the surface being a discontinuous surface comprising surface regions separated by gaps;
   selectively depositing the filament on the surface regions in a predetermined pattern defined by the motion of the nozzle relative to the discontinuous surface, whereby neither the flowable carrier nor the braze powders are deposited into the gaps, the braze powders thereby being selectively deposited only on the surface regions, wherein selectively depositing the filament on the surface regions comprises semi-continuously depositing the filament, with stops and starts in the deposition, as the nozzle moves relative to the discontinuous surface; and
   after selectively depositing the filament on the surface regions, heating the filament to remove the flowable carrier and adhere the braze powder to the surface regions, the heating comprising pyrolyzing or vaporizing the flowable carrier at a temperature no higher than a solidus of the braze powder, thereby forming a prewet surface for diffusion bonding.

2. The printing method of claim 1, wherein the surface is part of a first component comprising a metal alloy.

3. The printing method of claim 2, wherein the first component comprises part of an airfoil, a combustion liner, or a heat shield of a gas turbine engine.

4. The printing method of claim 1, wherein the braze powder comprises a nickel-based braze alloy, a titanium based-braze alloy, or an iron-based braze alloy.

5. The printing method of claim 1, wherein the filament includes braze powder in an amount from about 50 wt. % to about 90 wt. %.

6. The printing method of claim 1, wherein the flowable carrier comprises a thermoplastic polymer.

7. The printing method of claim 6, wherein the thermoplastic polymer comprises polylactic acid (PLA), acrylonitrile butadiene styrene (ABS), polycarbonate (PC), polyvinyl alcohol (PVA), and/or nylon.

8. The printing method of claim 1, wherein the extrusion is carried out at room temperature.

9. The printing method of claim 1, wherein the filament comprising the flowable carrier mixed with the braze powder has a viscosity in a range from about 2,000 cP to about 5,000 cP at 18° C. to 25° C.

10. The printing method of claim 1, wherein the flowable carrier comprises an aqueous or organic binder gel.

11. The printing method of claim 1, wherein the heating is carried out in a vacuum or an inert gas atmosphere.

12. A method of diffusion bonding comprising:
    the printing method of claim 1, further comprising assembling a first component comprising the prewet surface with a second component comprising a mating surface to form an assembly, the prewet surface contacting the mating surface; and
    exposing the assembly to a bonding temperature and a compressive force, thereby diffusion bonding the first component to the second component to form a monolithic third component comprising a bonded interface.

13. A printing method to selectively deposit braze powders on a surface, the method comprising:
    extruding a filament from a nozzle moving relative to a surface, the filament comprising a flowable carrier mixed with a braze powder, the surface being a discontinuous surface comprising surface regions separated by gaps; and
    selectively depositing the filament on the surface regions in a predetermined pattern defined by the motion of the nozzle relative to the discontinuous surface, whereby neither the flowable carrier nor the braze powders are deposited into the gaps, the braze powders thereby being selectively deposited only on the surface regions, wherein selectively depositing the filament on the surface regions comprises semi-continuously depositing the filament, with stops and starts in the deposition, as the nozzle moves relative to the discontinuous surface,
    wherein the extrusion is carried out at a temperature at or above a softening temperature and/or melting temperature of the flowable carrier, the braze powder remaining solid and being transported by the flowable carrier during the extrusion; and
    after the extrusion, cooling the filament and solidifying the flowable carrier to adhere the braze powder to the surface regions, thereby forming a prewet surface for diffusion bonding.

14. A method of diffusion bonding comprising:
    the printing method of claim 13, further comprising assembling a first component comprising the prewet surface with a second component comprising a mating surface to form an assembly, the prewet surface contacting the mating surface; and
    exposing the assembly to a bonding temperature and a compressive force, thereby diffusion bonding the first component to the second component to form a monolithic third component comprising a bonded interface.

15. The method of claim 14, further comprising, prior to exposing the assembly to the bonding temperature, warming the assembly to a softening temperature in a range from about 160° C. to about 220° C. to allow the flowable carrier to soften.

* * * * *